United States Patent
Dugan et al.

(10) Patent No.: US 12,436,712 B2
(45) Date of Patent: Oct. 7, 2025

(54) ACCESS REQUEST REORDERING ACROSS A MULTIPLE-CHANNEL INTERFACE FOR MEMORY-BASED COMMUNICATION QUEUES

(71) Applicant: Micron Technology, Inc., Boise, ID (US)

(72) Inventors: Michael Keith Dugan, Richardson, TX (US); Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 85 days.

(21) Appl. No.: 17/898,929

(22) Filed: Aug. 30, 2022

(65) Prior Publication Data
US 2024/0069795 A1    Feb. 29, 2024

(51) Int. Cl.
*G06F 3/06* (2006.01)

(52) U.S. Cl.
CPC .......... *G06F 3/0656* (2013.01); *G06F 3/0604* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | |
|---|---|---|
| 7,080,170 B1 | 7/2006 | Zuraski, Jr. et al. |
| 10,942,742 B1* | 3/2021 | Diamant .............. G06F 9/3017 |
| 2010/0318998 A1* | 12/2010 | Golla .................. G06F 9/5011 |
| | | 718/104 |

(Continued)

FOREIGN PATENT DOCUMENTS

| | | |
|---|---|---|
| CN | 117631974 A | 3/2024 |
| CN | 117631976 A | 3/2024 |

OTHER PUBLICATIONS

Sharma, D Das, "Compute Express Link", [Online]. Retrieved from the Internet: URL: https: www.computeexpresslink.org resource-library, (Mar. 1, 2019), 3 pages.

(Continued)

*Primary Examiner* — Jared I Rutz
*Assistant Examiner* — Alexander J Yoon
(74) *Attorney, Agent, or Firm* — Schwegman Lundberg & Woessner, P.A.

(57) ABSTRACT

A system includes a host device having a first buffer with ordered data. An accelerator device has a data movement processor and a reordering buffer. A multiple-channel interface couples the host device and the data movement processor of the accelerator device. The data movement processor is configured to issue a read command for a portion of the ordered data. In coordination with issuing the read command, an entry of the reordering buffer is allocated. A transaction identifier for the read command is allocated. Unordered responses are received from the host device via the multiple-channel interface. The responses include respective portions of the ordered data and a respective transaction identifier. The responses are reordered in the reordering buffer based on the respective transaction identifiers and the allocated entry of the reordering buffer.

18 Claims, 8 Drawing Sheets

(56) References Cited

U.S. PATENT DOCUMENTS

| | | | |
|---|---|---|---|
| 2015/0113190 A1* | 4/2015 | Wohlgemuth | H04L 69/22 |
| | | | 710/200 |
| 2015/0199286 A1 | 7/2015 | Hughes et al. | |
| 2017/0132010 A1* | 5/2017 | Vasekin | G06F 9/384 |
| 2017/0168544 A1* | 6/2017 | Battle | G06F 9/30101 |
| 2018/0095756 A1* | 4/2018 | Hasenplaugh | G06F 9/3016 |
| 2018/0107487 A1* | 4/2018 | Spasov | G06F 9/3836 |
| 2018/0307492 A1 | 10/2018 | Di | |
| 2021/0117340 A1* | 4/2021 | Trikalinou | H04L 9/0637 |
| 2022/0067154 A1* | 3/2022 | Favor | G06F 21/556 |
| 2024/0069805 A1 | 2/2024 | Dugan et al. | |

OTHER PUBLICATIONS

Sharma, Debendra Das, "Compute Express Link 2.0 White Pape", [Online]. Retrieved from the Internet: URL: https: www.computeexpresslink.org resource-library, (Nov. 1, 2020), 4 pages.

Sharma, Debendra Das, "CXL: Coherency, Memory, and I ??O Semantics on PCIe Infrastructure", [Online]. Retrieved from the Internet: URL: https: www.electronicdesign.com technologies embedded-revolution article 21162617 cxl-coherency-memory-and-io-semantics-on-pcie-infrastructure, (May 11, 2021), 15 pages.

"U.S. Appl. No. 17/899,016, Advisory Action mailed Oct. 21, 2024", 3 pgs.

"U.S. Appl. No. 17/899,016, Final Office Action mailed Aug. 19, 2024", 20 pgs.

"U.S. Appl. No. 17/899,016, Response filed Sep. 30, 2024 to Final Office Action mailed Aug. 19, 2024", 12 pgs.

\* cited by examiner

US 12,436,712 B2

ACCESS REQUEST REORDERING ACROSS A MULTIPLE-CHANNEL INTERFACE FOR MEMORY-BASED COMMUNICATION QUEUES

STATEMENT REGARDING FEDERALLY SPONSORED RESEARCH OR DEVELOPMENT

This invention was made with Government support under Agreement No. DE-AC05-76RL01830, awarded by the US Department of Energy. The Government has certain rights in the invention.

TECHNICAL FIELD

Embodiments pertain to memory devices. Some embodiments pertain to access request reordering in memory devices.

BACKGROUND

Memory devices for computers or other electronic devices may be categorized as volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is an architectural property of the system where the data stored in the media is available after system reset or power-cycling. In some examples, non-volatile memory media may be used to build a system with a persistent memory model.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

Various protocols or standards can be applied to facilitate communication between a host and one or more other devices such as memory buffers, accelerators, or other input/output devices. In an example, an unordered protocol such as Compute Express Link (CXL) can be used to provide high-bandwidth and low-latency connectivity.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
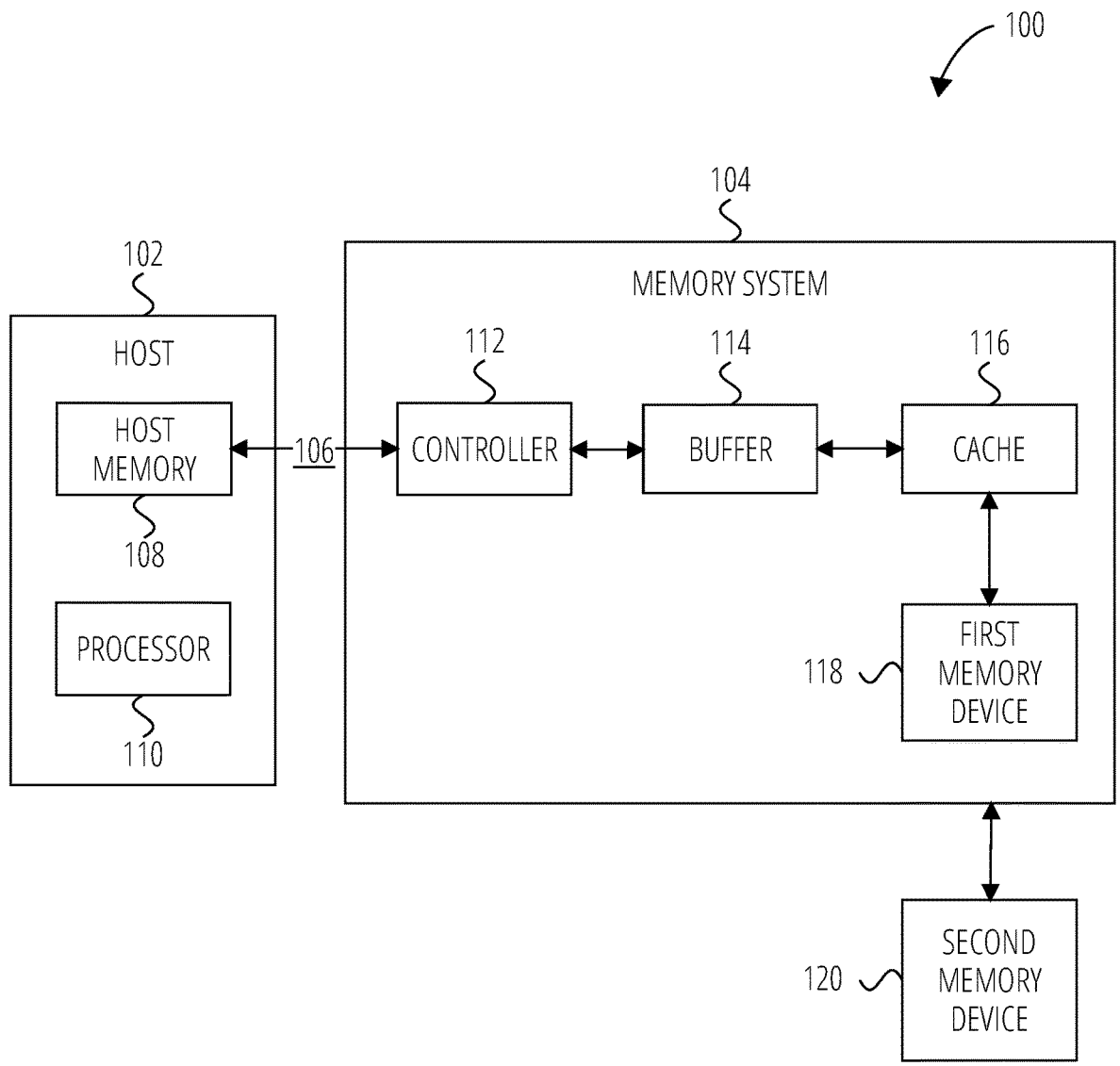
FIG. 1 illustrates generally a block diagram of an example computing system including a host and a memory device.

Compute Express Link (CXL) is an open standard interconnect configured for high-bandwidth, low-latency connectivity between host devices and other devices such as accelerators, memory buffers, and smart I/O devices. CXL was designed to facilitate high-performance computational workloads by supporting heterogeneous processing and memory systems. CXL enables coherency and memory semantics on top of PCI Express (PCIe)-based I/O semantics for optimized performance.

In some examples, CXL is used in applications such as artificial intelligence, machine learning, analytics, cloud infrastructure, edge computing devices, communication systems, and elsewhere. Data processing in such applications can use various scalar, vector, matrix and spatial architectures that can be deployed in CPU, GPU, FPGA, smart NICs, and other accelerators that can be coupled using a CXL link.

CXL supports dynamic multiplexing using a set of protocols that includes input/output (CXL.io, based on PCIe), caching (CXL.cache), and memory (CXL.memory) semantics. In an example, CXL can be used to maintain a unified, coherent memory space between the CPU (e.g., a host device or host processor) and any memory on the attached CXL device. This configuration allows the CPU and other device to share resources and operate on the same memory region for higher performance, reduced data-movement, and reduced software stack complexity. In an example, the CPU is primarily responsible for maintaining or managing coherency in a CXL environment. Accordingly, CXL can be leveraged to help reduce device cost and complexity, as well as overhead traditionally associated with coherency across an I/O link.

CXL runs on PCIe PHY and provides full interoperability with PCIe. In an example, a CXL device starts link training in a PCIe Gen 1 Data Rate and negotiates CXL as its operating protocol (e.g., using the alternate protocol negotiation mechanism defined in the PCIe 5.0 specification) if its link partner is capable of supporting CXL. Devices and platforms can thus more readily adopt CXL by leveraging the PCIe infrastructure and without having to design and validate the PHY, channel, channel extension devices, or other upper layers of PCIe.

In an example, CXL supports single-level switching to enable fan-out to multiple devices. This enables multiple devices in a platform to migrate to CXL, while maintaining backward compatibility and the low-latency characteristics of CXL.

In an example, CXL can provide a standardized compute fabric that supports pooling of multiple logical devices (MLD) and single logical devices such as using a CXL switch connected to several host devices or nodes (e.g., Root Ports). This feature enables servers to pool resources such as accelerators and/or memory that can be assigned according to workload. For example, CXL can help facilitate resource allocation or dedication and release. In an example, CXL can help allocate and deallocate memory to various host devices according to need. This flexibility helps designers avoid over-provisioning while ensuring best performance.

Some of the compute-intensive applications and operations mentioned herein can require or use large data sets. Memory devices that store such data sets can be configured for low latency and high bandwidth and persistence. One problem of a load-store interconnect architecture includes guaranteeing persistence. CXL can help address the problem using an architected flow and standard memory management interface for software, such as can enable movement of persistent memory from a controller-based approach to direct memory management.

One or more memory-based queues may be used between the CPU and the CXL device. The queues are used to exchange commands and responses (e.g., for queue maintenance updates) between applications running on a host processor and processing elements on one or more CXL devices. In an example, the queues can be circular queues with read and write pointers maintained through memory writes.

According to various examples, the network between the CPU and the CXL device does not guarantee ordering for read commands and responses. Thus, the response order for a pair of read requests to addresses A and B may be reversed. For example, a response message or data from the read to address B may return before the data from address A. Operation execution and timing issues can arise in unordered systems, such as including systems that use CXL. Maintaining the order of a command stream issued by a CPU may allow for proper execution of the commands. In an example, a host device can create a series of commands that it queues for execution by an accelerator (e.g., a CXL device). The accelerator can retrieve the commands from the queue and execute the commands in order (e.g., in a first-in-first-out manner).

In some applications, maintaining order allows for optimizing performance and ensuring valid results. For example, operation order enforcement can be important for performing nested loops or matrix computations, where results from earlier operations can be used in later operations. Embodiments described herein allow for reordering the commands to their order of issuance. Some implementations may allow for independent reordering of a stream of commands from each of a plurality of host queues (e.g., up to 32 host queues).

FIG. 1 illustrates generally a block diagram of an example of a computing system 100 including a host device 102 and a memory system 104. The host device 102 includes a central processing unit (CPU) or processor 110 and a host memory 108. In an example, the host device 102 can include a host system such as a personal laptop computer, a desktop computer, a digital camera, a smart phone, a memory card reader, and/or Internet-of-thing enabled device, among various other types of hosts, and can include a memory access device, e.g., the processor 110. The processor 110 can include one or more processor cores, a system of parallel processors, or other CPU arrangement.

The memory system 104 includes a controller 112, a buffer 114, a cache 116, and a first memory device 118. The first memory device 118 can include, for example, one or more memory modules (e.g., single in-line memory modules, dual in-line memory modules, etc.). The first memory device 118 can include volatile memory and/or non-volatile memory and can include a multiple-chip device that comprises one or multiple different memory types or modules. In an example, the computing system 100 includes a second memory device 120 that interfaces with the memory system 104 and the host device 102.

The host device 102 can include a system backplane and can include a number of processing resources (e.g., one or more processors, microprocessors, or some other type of controlling circuitry). The computing system 100 can optionally include separate integrated circuits for the host device 102, the memory system 104, the controller 112, the buffer 114, the cache 116, the first memory device 118, the second memory device 120, any one or more of which may comprise respective chiplets that can be connected and used together. In an example, the computing system 100 includes a server system and/or a high-performance computing (HPC) system and/or a portion thereof. Although the example shown in FIG. 1 illustrates a system having a Von Neumann architecture, embodiments of the present disclosure can be implemented in non-Von Neumann architectures, which may not include one or more components (e.g., CPU, ALU, etc.) often associated with a Von Neumann architecture.

In an example, the first memory device 118 can provide a main memory for the computing system 100, or the first memory device 118 can comprise accessory memory or storage for use by the computing system 100. In an example, the first memory device 118 or the second memory device 120 includes one or more arrays of memory cells, e.g., volatile and/or non-volatile memory cells. The arrays can be flash arrays with a NAND architecture, for example. Embodiments are not limited to a particular type of memory device. For instance, the memory devices can include RAM, ROM, DRAM, SDRAM, PCRAM, RRAM, and flash memory, among others.

In embodiments in which the first memory device 118 includes persistent or non-volatile memory, the first memory device 118 can include a flash memory device such as a NAND or NOR flash memory device. The first memory device 118 can include other non-volatile memory devices such as non-volatile random-access memory devices (e.g., NVRAM, ReRAM, FeRAM, MRAM, PCM), "emerging" memory devices such as a ferroelectric RAM device that includes ferroelectric capacitors that can exhibit hysteresis characteristics, a 3-D Crosspoint (3D XP) memory device, etc., or combinations thereof.

In an example, the controller 112 comprises a media controller such as a non-volatile memory express (NVMe) controller. The controller 112 can be configured to perform operations such as copy, write, read, error correct, etc. for the first memory device 118. In an example, the controller 112 can include purpose-built circuitry and/or instructions to perform various operations. That is, in some embodiments, the controller 112 can include circuitry and/or can be configured to perform instructions to control movement of data and/or addresses associated with data such as among the buffer 114, the cache 116, and/or the first memory device 118 or the second memory device 120.

In an example, at least one of the processor 110 and the controller 112 comprises a memory controller (MC) for the memory system 104. The MC can receive, such as from the host device 102, a read command for a particular logic row address in the first memory device 118 or the second memory device 120. In some examples, the MC can determine that the logical row address is associated with a first row based at least in part on a pointer stored in a register of the controller 112. In an example, the MC can receive, from the host device 102, a write command for a logical row address, and the write command can be associated with second data. In some examples, the MC can be configured to issue, to non-volatile memory and between issuing the read command and the write command, an access command associated with the first memory device 118 or the second memory device 120. In some examples, the MC can issue, to the non-volatile memory and between issuing the read command and the write command, an access command associated with the first memory device 118 or the second memory device 120.

In an example, the buffer 114 comprises a data buffer circuit that includes a region of a physical memory used to temporarily store data, for example, while the data is moved from one place to another. The buffer 114 can include a first-in, first-out (FIFO) buffer in which the oldest (e.g., the first-in) data is processed first. In some embodiments, the buffer 114 includes a hardware shift register, a circular buffer, or a list.

In an example, the cache 116 comprises a region of a physical memory used to temporarily store particular data that is likely to be used again. The cache 116 can include a pool of data entries. In some examples, the cache 116 can be configured to operate according to a write-back policy in which data is written to the cache without the being concurrently written to the first memory device 118. Accordingly, in some embodiments, data written to the cache 116 may not have a corresponding data entry in the first memory device 118.

In an example, the controller 112 can receive write requests involving the cache 116 and cause data associated with each of the write requests to be written to the cache 116. In some examples, the controller 112 can receive the write requests at a rate of thirty-two (32) gigatransfers (GT) per second, such as according to or using a CXL protocol. The controller 112 can similarly receive read requests and cause data stored in, e.g., the first memory device 118 or the second memory device 120, to be retrieved and written to, for example, the host device 102 via the interface 106.

In an example, the interface 106 can include any type of communication path, bus, or the like that allows for information to be transferred between the host device 102 and the memory system 104. Non-limiting examples of interfaces can include a peripheral component interconnect (PCI) interface, a peripheral component interconnect express (PCIe) interface, a serial advanced technology attachment (SATA) interface, and/or a miniature serial advanced technology attachment (mSATA) interface, among others. In an example, the interface 106 includes a PCIe 5.0 interface that is compliant with the compute express link (CXL) protocol standard. Accordingly, in some embodiments, the interface 106 supports transfer speeds of at least 32 GT/s.

As similarly described elsewhere herein, CXL is a high-speed central processing unit (CPU)-to-device and CPU-to-memory interconnect designed to enhance compute performance. CXL technology maintains memory coherency between the CPU memory space (e.g., the host memory 108) and memory on attached devices or accelerators (e.g., the first memory device 118 or the second memory device 120), which allows resource sharing for higher performance, reduced software stack complexity, and lower overall system cost. CXL is designed to be an industry open standard interface for high-speed communications as accelerators are increasingly used to complement CPUs in support of emerging data-rich and compute-intensive applications such as artificial intelligence and machine learning.

Figure 2:
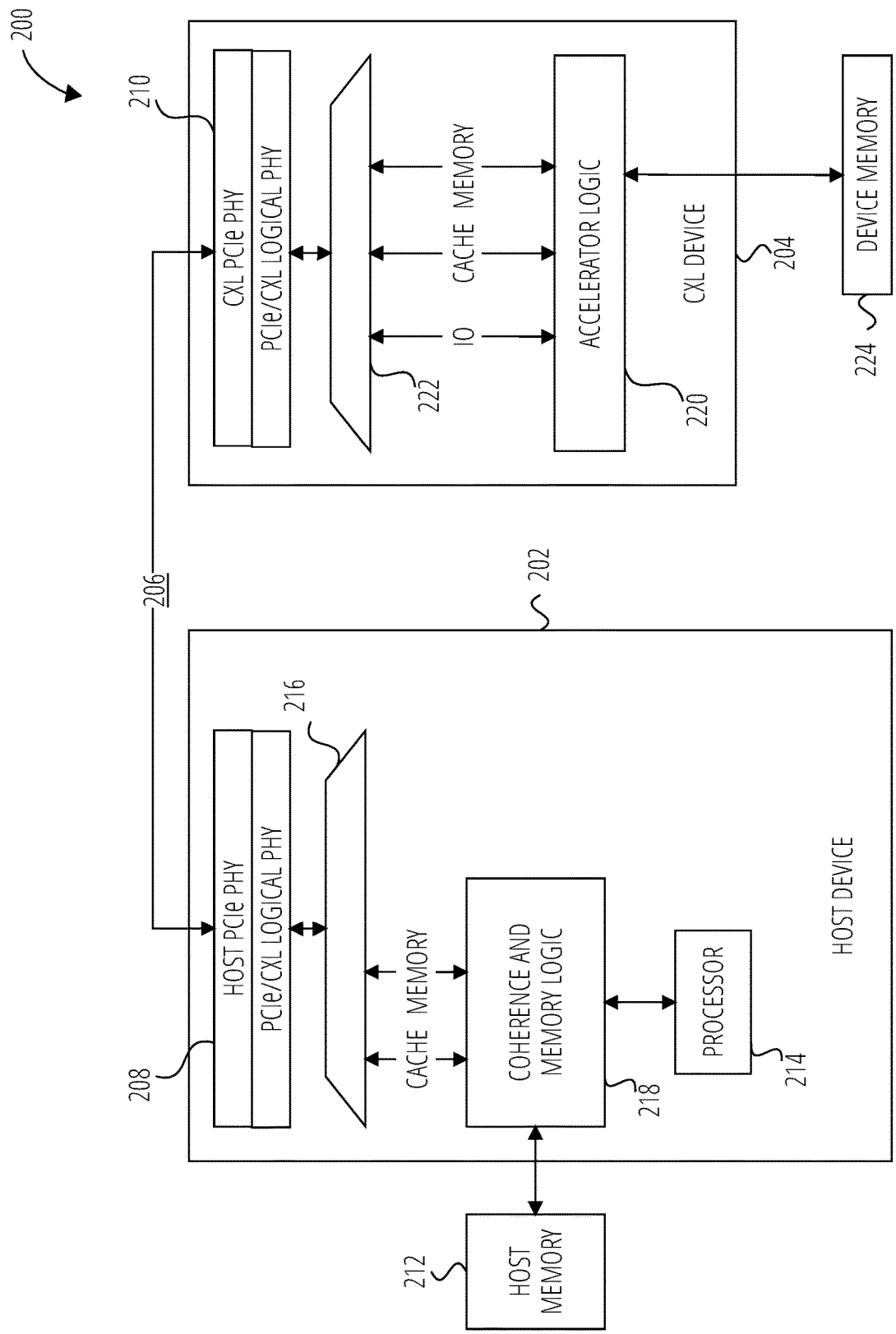
FIG. 2 illustrates generally an example of a CXL system that uses a CXL link to connect a host device and a CXL device.

FIG. 2 illustrates generally an example of a CXL system 200 that uses a CXL link 206 to connect a host device 202 and a CXL device 204. In an example, the host device 202 comprises or corresponds to the host device 102 and the CXL device 204 comprises or corresponds to the memory system 104 from the example of the computing system 100 in FIG. 1. In an example, the CXL link 206 can support communications using multiplexed protocols for caching (e.g., CXL.cache), memory accesses (e.g., CXL.mem), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL.cache can enable a device to cache data from the host memory (e.g., from the host memory 212) using a request and response protocol. CXL.memory can enable the host device 202 to use memory attached to the CXL device 204, for example, in or using a virtualized memory space. In an example, CXL.memory transactions can be memory load and store operations that run downstream from or outside of the host device 202.

In the example of FIG. 2, the host device 202 includes a host processor 214 (e.g., comprising one or more CPUs or cores). The host device 202 can comprise, or can be coupled to, host memory 212. The host device 202 can include various circuitry or logic configured to facilitate CXL-based communications and transactions with the CXL device 204. For example, the host device 202 can include coherence and memory logic 218 configured to implement transactions according to CXL.cache and CXL.mem semantics. In an example, the host device 202 can be configured to manage coherency of data cached at the CXL device 204 using, e.g., its coherence and memory logic 218.

The host device 202 can further include a host multiplexer 216 configured to modulate communications over the CXL link 206 (e.g., using the PCIe PHY layer 208, 210). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures may use different solutions, which in turn can compromise backward compatibility. CXL can address this problem by consolidating the coherency function at the host device 202, such as using the coherence and memory logic 218.

The CXL device 204 can include an accelerator device that comprises various accelerator logic 220. In an example, the CXL device 204 can comprise, or can be coupled to, CXL device memory 224. The CXL device 204 can include various circuitry or logic configured to facilitate CXL-based communications and transactions with the host device 202 using the CXL link 206. For example, the accelerator logic 220 can be configured to implement transactions according to CXL.cache, CXL.mem, and CXL.io semantics. The CXL device 204 can include a CXL device multiplexer 222 configured to control communications over the CXL link 206.

In an example, the accelerator logic 220 comprises a Unified Assist Engine (UAE) or compute fabric with various functional units such as a command manager (CM), Threading Engine (TE), Streaming Engine (SE), Data Manager or data mover (DM), or other unit. The compute fabric can be reconfigurable and can include separate synchronous and asynchronous flows.

The accelerator logic 220 or portions thereof can be configured to operate in an application space of the CXL system 200 and, in some examples, can initiate its own threads or sub-threads, which can operate in parallel and can optionally use resources or units on other CXL devices 204. Queue and transaction control through the system can be coordinated by the CM, TE, SE, or DM components of the UAE.

Figure 3:
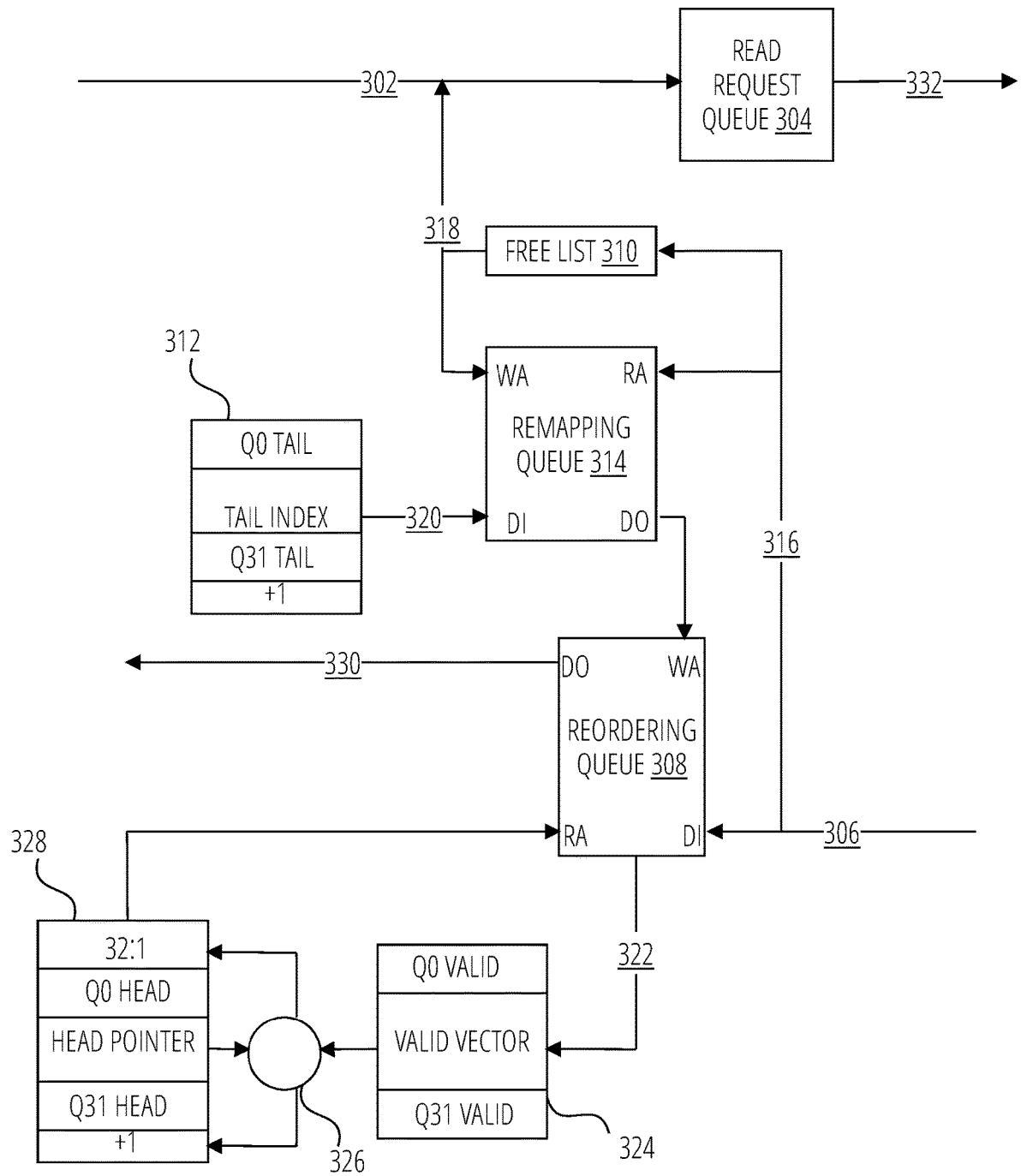
FIG. 3 illustrates a system for reordering host commands between the host processor and the CXL device.

FIG. 3 illustrates an example of a system and information or processing flow for reordering host command responses, in accordance with embodiments described herein. According to various examples, multiple request streams are reordered over a single interface. For example, 32 request streams may be reordered over the single interface. In the example, a read request 302 is received at a read request queue 304. The read request 302 is transmitted 332 to the network between the host processor and the CXL device. A network response 306 to the read request is received at the reordering queue 308. According to some examples, a reordering queue 308 per host queue ID is used to receive read responses 306 from the network.

When a read request is received 302, a reorder queue entry can be allocated in the reordering queue 308. The reorder queue entry can correspond to a tail index entry from a tail index table 312. The value of the tail index from the tail index table is determined by the host queue id of the read request. The tail index can be associated with a particular write address of the reordering queue 308.

In this example, each of the reordering queue 308 and remapping queue 314 can be configured to receive a read address, RA, a data input, DI, a write address, WA, an incoming data in, DI, and can be configured to provide an outgoing data output, DO. The reordering queue is organized as a collection of logical circular queues. Each circular queue is associated with a host queue ID that is specified by the read request 302. In this example the number of logical queue segments within the reordering queue is 32. It is to be understood that logical queue segments herein may be described as queues and/or segments.

According to various embodiments, an entry from a free list 310 can be allocated. The free list 310 can include a list of indices or buffer pointers that can be available for allocation.

A free list index of the allocated free list 310 entry may be used to access 318 a remapping queue 314. When a free list entry is allocated a corresponding entry in a remapping queue 314 is written with the tail index of the reordering queue associated with the request host queue ID.

In an example, each of the read requests can be associated with a Transaction Identifier (TID), such as can be used by the network. The TID may be referred to herein as a network read request ID and/or an ID. In an example, a free list index from the free list 310 may be used as the TID and may be returned 306 with the read response from the network. When the TID is allocated from the free list as the request 302 is received, it is used to write the tail index to the remapping queue 314. When the read response is returned 306 the TID is used to read the remapping queue to retrieve the reordering queue 308 write pointer for the response.

In response to allocating a reordering queue entry, the tail index for the selected reordering queue segment is incremented to point to the next entry in the reordering queue 308. An immediately subsequent read request may be associated with the next entry in the reordering queue 308.

When a read response 306 is received from the network, the ID of the response is used to read the remapping queue 314. The remapping queue 314 returns the reordering queue tail index that was assigned when the read request was sent. The tail index that was returned by the remapping queue 314 provides the write address for the response to be written to the reordering queue 308. When the response is written to the reordering queue, the ID is returned to the free list 310 and the remapping queue entry is freed.

According to various embodiments, one valid vector 324 per host queue can be used. The width of the valid vector 324 may be set to the number of entries in the reordering queue 308 segment. When a read response is written to the reordering queue 308, the valid bit in the vector corresponding to that reorder queue entry is set 322.

Each reordering queue 308 segment can have a respective head pointer from a head pointer table 328. In an example, the head pointer is an index associated with the reordering queue 308 and it corresponds to a next in-order entry to be read from the reordering queue 308 segment.

Both of the valid vector 324 and the head pointer of the reordering queue 308 can be used to determine when an entry may be removed from the reordering queue 308. For example, if the bit in the valid vector 324 corresponding to the value of the current head pointer is set, then that entry can be known to contain the next read response in issue order. That read response can then be read from the reordering queue 308. When an entry is read from the reordering queue 308, the head pointer is incremented and the corresponding bit in the valid vector 324 is cleared. An arbitration processor 326 uses the valid bits to determine if any packets are ready to send. The arbitration processor 326 may do this by determining if the valid bit is set for an entry corresponding to the head pointer position in the reordering queue 308. Once the reordered read response is removed from the reordering queue the reordering queue entry is freed.

Figure 4:
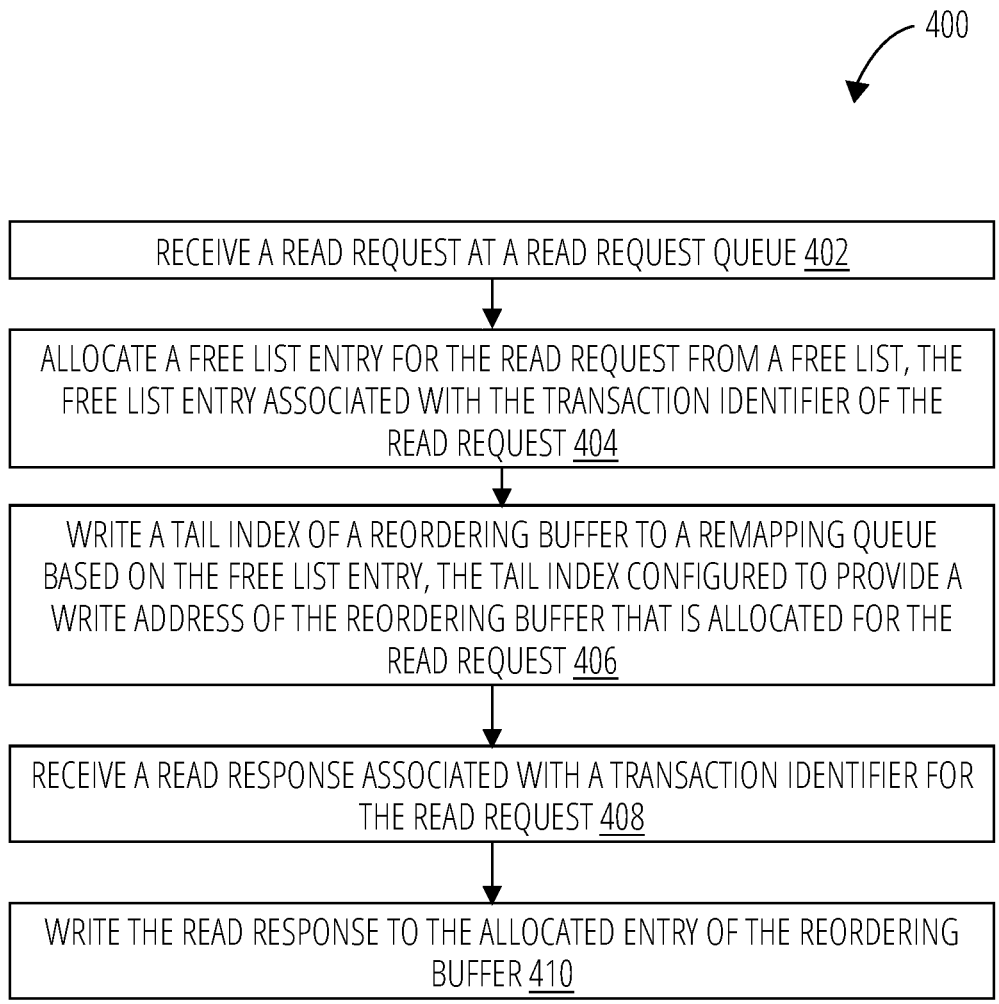
FIG. 4 illustrates a process for reordering access requests between the host processor and the CXL device.

FIG. 4 illustrates a process for reordering command read responses in accordance with embodiments described herein. In block 402, routine 400 receives a read request at a read request queue. The read request may be sent from the read request queue to a host device using a CXL interconnect, for example In block 404 routine 400 allocates a free list entry for the read request from a free list. The free list entry may be associated with a transaction identifier of the read request. According to various configurations, the transaction identifier is received from the network with a response to the read request.

In block 406, routine 400 writes a tail index of the reorder queue to a remapping queue based on the free list entry. The tail index may be configured to provide a write address of the reordering queue that is allocated for the read response. In some examples, in response to writing the tail index to a remapping queue, the tail index is incremented to point to a different location in the reordering queue.

In an example, one or more of the reordering queue, remapping queue, and the read request queue is a circular queue. In some cases, there are a plurality of read request queues and each read request queue is associated with a respective free list, a respective remapping queue, and a respective reordering queue.

A network response to the read request may be received at a reorder queue at block 408. In block 410, routine 400 writes the read response to the allocated entry of the reordering queue. According to some examples, a valid vector having a same number of entries as the reordering queue is provided. In response to writing the read response to the allocated entry of the reordering queue, a valid bit corresponding to the allocated entry of the reordering queue is set. According to some examples, in response to writing the read response to the allocated entry of the reordering queue, the remapping queue entry is freed and the free list entry is returned to the free list.

According to some embodiments, the reordering queue has an associated head pointer that corresponds to a next in-order entry to be read from the reordering queue. The head pointer may be incremented when an entry is read from the reordering queue.

The process described in FIG. 4 may be used in conjunction with a scatter and/or gather system. For example, the read response may comprise index buffer data. The index read requests may be generated by a single requestor and distributed across multiple internal network interfaces, for example. The read responses may be returned on those interfaces, reordered and forwarded to processing elements that can use them to build operand addresses for a data movement engine.

Figure 5:
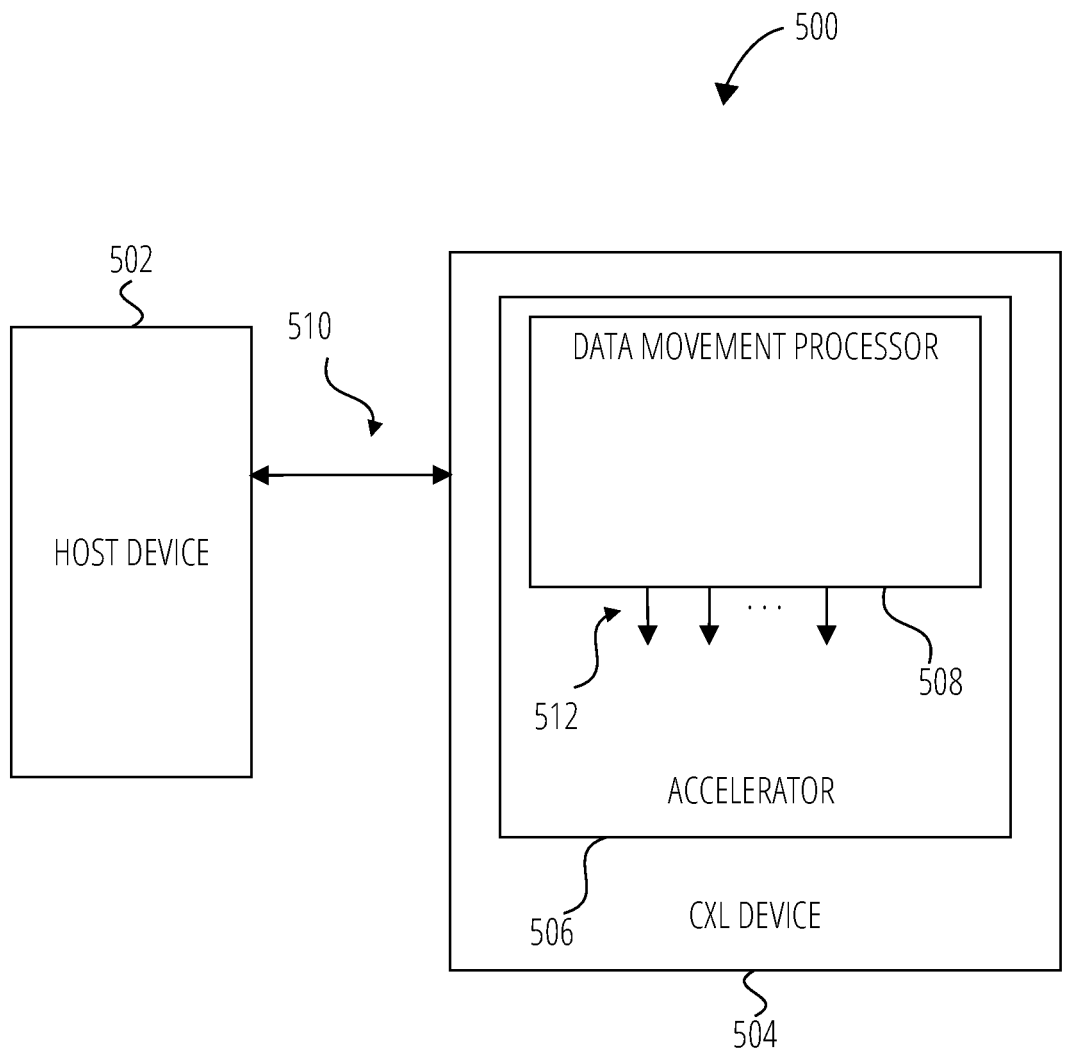
FIG. 5 illustrates an example of a Near Memory Compute (NMC) device that uses a multiple-channel interface to connect a host device and a CXL device.

FIG. 5 illustrates generally an example of a Near Memory Compute (NMC) device 500 that uses a single CXL interface 510 to connect a host device 502 and a CXL device 504. In an example, the host device 502 comprises or corresponds to the host device 202 and the CXL device 504 comprises or corresponds to the CXL device 204 from the example of the CXL system 200 in FIG. 2.

The CXL device 504 can include an accelerator 506 as described above in the description for FIG. 2. In this example, the accelerator 506 comprises a data movement processor 508. The data movement processor 508 may be configured to perform gather (e.g. read) and/or scatter (e.g. write) operations on a non-contiguously stored data region. The addresses of the operands to be read or written can be in a contiguous index buffer in the main memory of a the host device 502. The data movement processor 508 reads the contents of the index buffer and uses the data to create operand addresses. Ensuring that the order in which the operand addresses are processed matches the order in which they were read from the index buffer allows the data movement operation to execute correctly. The CXL network 510 connecting the CXL device 504 to the host 502 may not guarantee ordering of reads or writes.

The data movement processor 508 has multiple channel interfaces 512 within the accelerator block 506 of the CXL Device 504 that is configured provide access to device resident memory and to the external host network connection 510. To maximize utilization of the network and memory bandwidth, the memory accesses including those to the index buffer may be interleaved across the internal channel interfaces 512. The data movement processor may be configured to reorder the index buffer read responses to the order in which the read requests were issued across the internal channel interfaces 512.

Figure 6:
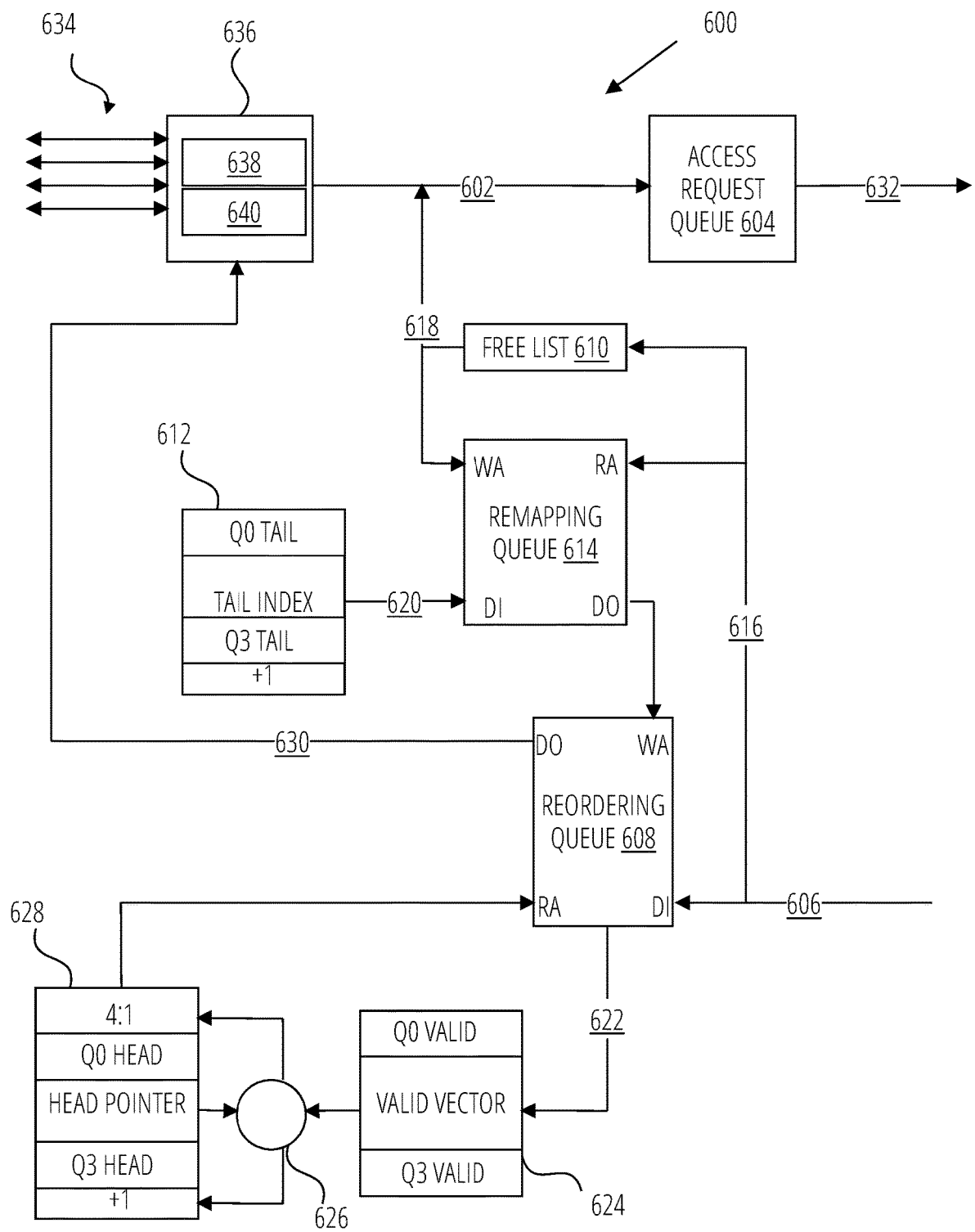
FIG. 6 illustrates a system for reordering access requests received over a multiple channel interface to connect the host processor and the CXL device.

FIG. 6 illustrates an example of a reordering system 600 and information or processing flow for reordering memory read responses by the data movement processor 508, in accordance with embodiments described herein. In the example, access requests are sent across a plurality of channels 634 through a multiple-channel interface 636. In this example, the multiple-channel interface 636 is a four-channel interface, and the multiple-channel interface 636 is configured to manage incoming queues 638 and outgoing queues 640. It is to be understood that requests sent on different channels of the multiple channel interface may be reordered substantially in parallel. That is, multiple instances of reordering system 600 may be used to reorder each response of the multiple requests received in parallel. In the example of FIG. 6, four instances of reordering system 600 may be used to reorder responses in parallel.

The access requests may be sorted into one of a plurality of incoming queues 638. Each of the incoming queues 638 is associated with a request channel 634. In some examples, there could be one or more respective logical sub channels associated with each of the request channels 634.

The access request queue 604 receives an access request 602 from one of the incoming queues 638. The access request 602 is transmitted 632 to the network between the host processor and the CXL device. A network response 606 to the access request is received at the reordering queue 608. According to some examples, a reordering queue 608 per request channel 634 is used to receive responses 606 from the network. The number of response interfaces 606 in this example is 4. In some examples, a number of reorder queues can be different than a number of the access request queues.

When a read request is transmitted 632 to the network, a reorder queue entry can be allocated in the reordering queue 608. The reorder queue entry can correspond to a tail index entry from a tail index table 612. The tail index can be associated with a particular write address of the reordering queue 608.

In this example, each of the reordering queue 608 and remapping queue 614 can be configured to receive a read address, RA, a data input, DI, an write address, WA, and can be configured to provide an incoming data in, DI, and an outgoing data output, DO.

According to various embodiments, an entry from a free list 610 can be allocated. The free list 610 can include a list of indices or buffer pointers that can be available for allocation.

A free list index of the allocated free list 610 entry may be used to access 618 a remapping queue 614. When a free list entry is allocated a corresponding entry in a remapping queue 614 is written with the tail index of the reordering queue associated with the interface on which the request arrived.

In an example, each of the access requests can be associated with a Transaction Identifier (TID), such as can be used by the network. The TID may be referred to herein as a network read request ID and/or an ID. In an example, a free list index from the free list 610 may be used as the TID and may be returned 606 with the read response from the network When the TID is allocated from the free list as the request 602 is received, it is used to write the tail index to the remapping queue 614. When the read response is returned 606 the TID is used to read the remapping queue to retrieve the reordering queue 608 write pointer for the response.

In response to allocating a reordering queue 608 entry, the tail index for the selected reordering queue segment is incremented to point to the next entry in the reordering queue 608. An immediately subsequent access request may be associated with the next entry in the reordering queue 608.

When an access request response 606 is received by the network, the ID of the response is used to access the remapping queue 614. The remapping queue 614 returns the reordering queue tail index that was assigned when the access request was sent. The tail index returned by the remapping queue 614 provides the write address for the response to be written to the reordering queue 608. When the response is written to the reordering queue, the ID is returned to the free list 610 and the remapping queue entry is freed. The access request response data is then sent 630 to the request generator associated with the multiple-channel interface 636 on which the request was received. The data is returned in the order that the requests were received at the request interface 636. Arbitration logic 626 sorts the reordered access response request data into one of a plurality of outgoing queues 640 according to the request interface on which the request arrived.

According to various embodiments, one valid vector 624 per requestor interface can be used. The width of the valid vector 624 may be set to a number of entries in the reordering queue 608. When an access request response is written to the reordering queue 608, the valid bit in the vector corresponding to that reorder queue entry is set 622.

Each reordering queue segment 608 can have a respective head pointer from a head pointer table 628. In an example, the head pointer is an index associated with the reordering queue 608 and it corresponds to a next in-order entry to be read from the reordering queue 608. The head pointer can be incremented when an entry is read from the reordering queue 608.

Both of the valid vector 624 and the head pointer of the reordering queue 608 can be used to determine when an entry may be removed from the reordering queue 608. For example, if the bit in the valid vector 624 corresponding to the value of the current head pointer is set, then that entry can be known to contain the next read response in issue order. That read response can then be read from the reordering queue 608. When an entry is read from the reordering queue 608, the head pointer is incremented and the corresponding bit in the valid vector 624 is cleared. An arbitration processor 626 uses the valid bits to determine if any packets are ready to send. The arbitration processor 626 may do this by determining if the valid bit is set for an entry corresponding to the head pointer position in the reordering queue 608. Once the reordered read response is removed from the reordering queue the entry may be freed.

Figure 7:
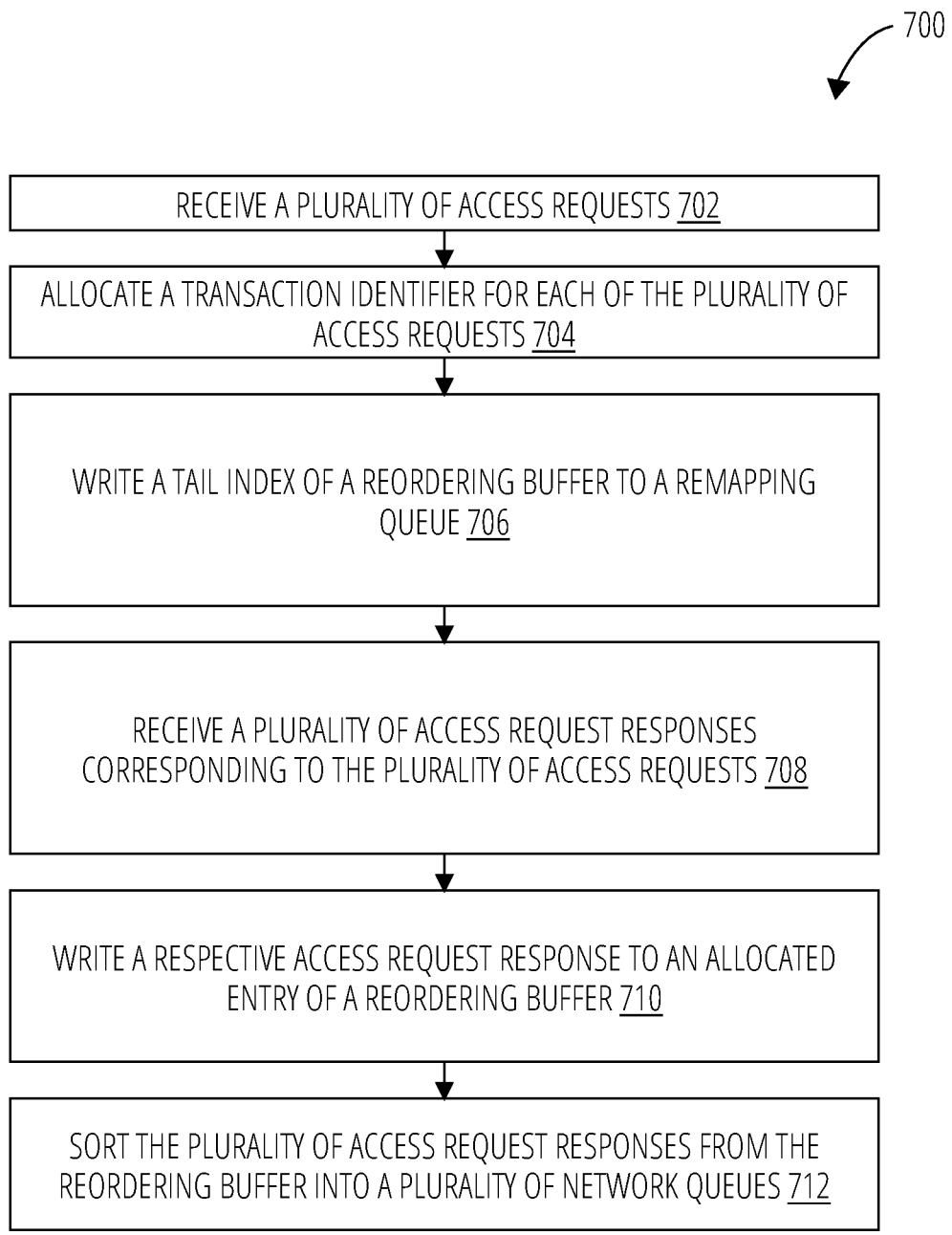
FIG. 7 illustrates a process for reordering access requests between the host processor and the CXL device over a multiple-channel interface.

FIG. 7 illustrates a process for reordering the responses for read access requests received over a multiple-channel interface in accordance with embodiments described herein. In block 702, routine 700 receives a plurality of access requests from a plurality of network interfaces. According to various examples, a plurality of operand addresses corresponding to the plurality of access requests are stored in a contiguous index buffer In block 704, routine 700 allocates a transaction identifier for each of the plurality of access requests. In block 706, routine 700 for each access request of the plurality of access requests, writes a tail index of a reordering buffer to a remapping queue based on the transaction identifier. The tail index may be configured to provide a write address of a reordering buffer entry that is allocated for the access request.

In block 708, routine 700 receives a plurality of access request responses corresponding to the plurality of access requests, the plurality of access requests received in a first order and the plurality of corresponding access request responses received in a second order. According to various configurations, the first order is different than the second order.

In block 710, routine 700 for each access request response, a respective access request response from the plurality of access request responses is written to the allocated entry of the reordering buffer.

In block 712, routine 700 sorts the plurality of reordered access request responses from the reordering buffer into a plurality of network queues in the first order.

Figure 8:
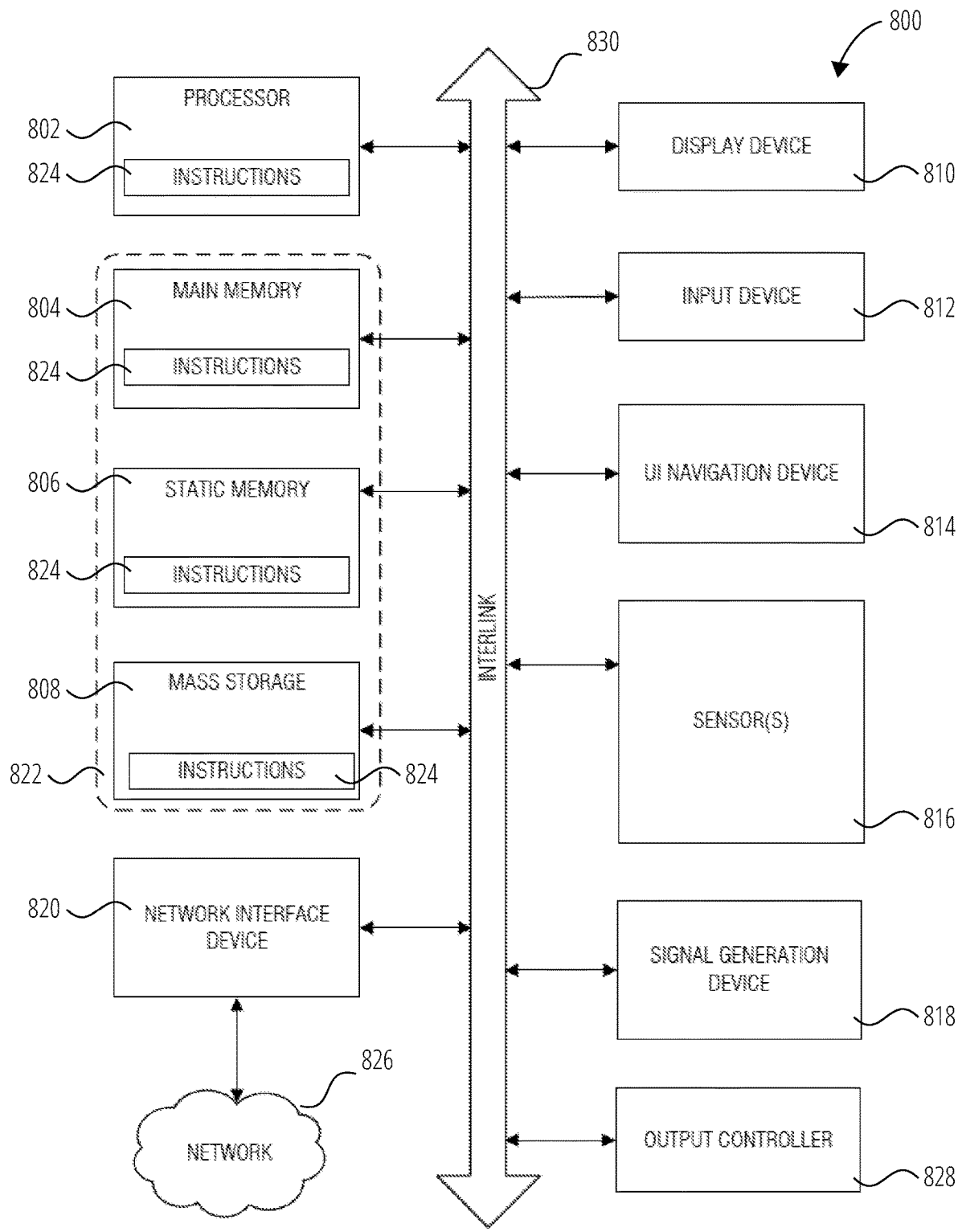
FIG. 8 illustrates a block diagram of an example machine with which, in which, or by which any one or more of the techniques discussed herein can be implemented.

FIG. 8 illustrates a block diagram of an example machine 800 with which, in which, or by which any one or more of the techniques (e.g., methodologies) discussed herein can be implemented. Examples, as described herein, can include, or can operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 800 (e.g., computer system) can include a hardware processor 802 or host device (e.g., the host device, a central processing unit (CPU), a graphics processing unit (GPU), a hardware processor core, or any combination thereof), a main memory 804, a static memory 806 (e.g., memory or storage for firmware, microcode, a basic-input-output (BIOS), unified extensible firmware interface (UEFI), etc.), and mass storage device 808 or memory die stack, hard drives, tape drives, flash storage, or other block devices) some or all of which can communicate with each other via an interlink 830 (e.g., bus). The machine 800 can further include a display device 810, an alphanumeric input device 812 (e.g., a keyboard), and a user interface (UI) Navigation device 814 (e.g., a mouse). In an example, the display device 810, the input device 812, and the UI navigation device 814 can be a touch screen display. The machine 800 can additionally include a mass storage device 808 (e.g., a drive unit), a signal generation device 818 (e.g., a speaker), a network interface device 820, and one or more sensor(s) 816, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 802, the main memory 804, the static memory 806, or the mass storage device 808 can be, or include, a machine-readable media 822 on which is stored one or more sets of data structures or instructions 824 (e.g., software) embodying or used by any one or more of the techniques or functions described herein. The instructions 824 can also reside, completely or at least partially, within any of registers of the hardware processor 802, the main memory 804, the static memory 806, or the mass storage device 808 during execution thereof by the machine 800. In an example, one or any combination of the hardware processor 802, the main memory 804, the static memory 806, or the mass storage device 808 can constitute the machine-readable media 822. While the machine-readable media 822 is illustrated as a single medium, the term "machine-readable medium" can include a single medium or multiple media (e.g., a centralized or distributed database, or associated caches and servers) configured to store the one or more instructions 824.

The term "machine readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 822 can be representative of the instructions 824, such as instructions 824 themselves or a format from which the instructions 824 can be derived. This format from which the instructions 824 can be derived can include source code, encoded instructions (e.g., in compressed or encrypted form), packaged instructions (e.g., split into multiple packages), or the like. The information representative of the instructions 824 in the machine-readable media 822 can be processed by processing circuitry into the instructions to implement any of the operations discussed herein. For example, deriving the instructions 824 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 can include assembly, compilation, or interpretation of the information (e.g., by the processing circuitry) to create the instructions 824 from some intermediate or preprocessed format provided by the machine-readable media 822. The information, when provided in multiple parts, can be combined, unpacked, and modified to create the instructions 824. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 824 can be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

To better illustrate the methods and apparatuses described herein, a non-limiting set of Example embodiments are set forth below as numerically identified Examples.

Example 1 can include or use subject matter such as a system, comprising a host device comprising a first buffer with ordered data, an accelerator device comprising a data movement processor and a reordering buffer, and a multiple-channel interface coupling the host device and the data movement processor of the accelerator device. In Example 1, the data movement processor can be configured to issue a read command for a portion of the ordered data and, in coordination with issuing the read command, allocate an entry of the reordering buffer and allocate a transaction identifier for the read command, and receive unordered responses from the host device via the multiple-channel interface, the responses comprising respective portions of the ordered data and a respective transaction identifier, and reorder the responses in the reordering buffer based on the respective transaction identifiers and the allocated entry of the reordering buffer.

Example 2 can include or use or can optionally be combined with the subject matter of example 1 to optionally include that the reordering buffer is a circular buffer.

Example 3 can include or use or can optionally be combined with the subject matter of examples 1 or 2 to optionally include that the first buffer comprises a contiguous buffer that stores operand address information.

Example 4 can include or use or can optionally be combined with the subject matter of any of examples 1-3 to optionally include that the multiple-channel interface comprises four channels coupled to respective request generators of the data movement processor.

Example 5 can include or use or can optionally be combined with the subject matter of any of examples 1-4 to optionally include that the data movement processor is configured to communicate the read command from a host device using a compute express link (CXL) interconnect.

Example 6 can include or use or can optionally be combined with the subject matter of any of examples 1-5 to optionally include a plurality of read command queues and that each read command queue is associated with a respective free list, a respective remapping queue, and a respective reordering buffer.

Example 7 can include or use or can optionally be combined with the subject matter of any of examples 1-6 to optionally include that the data movement processor is configured to receive unordered responses for data stored on a non-contiguously stored data region.

Example 8 can include or use subject matter such as a method, comprising receiving a plurality of access requests from a plurality of interfaces, and allocating a transaction identifier for each of the plurality of access requests, and for each access request of the plurality of access requests, writing a tail index of a reordering buffer to a remapping queue based on the transaction identifier, the tail index configured to provide a write address of a reordering buffer entry that is allocated for the access request. Example 8 can optionally further include receiving a plurality of access request responses corresponding to the plurality of access requests, the plurality of access requests received in a first order and the plurality of corresponding access request responses received in a second order, and for each access request response, writing a respective access request response from the plurality of access request responses to the allocated entry of the reordering buffer, and sorting the plurality of access request responses from the reordering buffer into a plurality of network queues in a same order as the plurality of corresponding access requests.

Example 9 can include or use or can optionally be combined with the subject matter of example 8 to optionally include that the first order is different than the second order.

Example 10 can include or use or can optionally be combined with the subject matter of any of examples 8 or 9 to optionally include storing a plurality of operand addresses corresponding to the plurality of access requests in a contiguous index buffer, the contiguous index buffer configured to store the access requests in the first order.

Example 11 can include or use or can optionally be combined with the subject matter of any of examples 8-10 to optionally include providing a valid vector having a same number of entries as the reordering buffer and, in response to writing the access request response to the allocated entry of the reordering buffer, setting a valid bit corresponding to the allocated entry of the reordering buffer, the valid bit indicating that the allocated entry contains a next operand address.

Example 12 can include or use or can optionally be combined with the subject matter of any of examples 8-11 to optionally include that the reordering buffer has an associated head pointer, the head pointer corresponding to a next in-order entry to be read from the reordering buffer.

Example 13 can include or use or can optionally be combined with the subject matter of example 12 to optionally include that the head pointer is configured to be incremented when an entry is read from the reordering queue.

Example 14 can include or use or can optionally be combined with the subject matter of any of examples 8-13 to optionally include that the reordering queue is a circular queue.

Example 15 can include or use or can optionally be combined with the subject matter of any of examples 8-14 to optionally include communicating the plurality of access requests from a host device using a compute express link (CXL) interconnect.

Example 16 can include or use or can optionally be combined with the subject matter of any of examples 8-15 to optionally include a plurality of access request queues and that each access request queue is associated with a respective free list, a respective remapping queue, and a respective reordering buffer.

Example 17 can include or use or can optionally be combined with the subject matter of any of examples 8-16 to optionally include, in response to writing the access request response to the allocated entry of the reordering buffer, returning a free list entry to the free list.

Example 18 can include or use or can optionally be combined with the subject matter of any of examples 8-17 to optionally include receiving the plurality of corresponding access request responses for data stored on a non-contiguously stored data region.

Example 19 can include or use or can optionally be combined with the subject matter of any of examples 8-18 to optionally include allocating a free list entry for the request from a free list, the free list entry associated with a transaction identifier of the access request.

Example 20 can include or use subject matter such as at least one non-transitory machine-readable storage medium comprising instructions that, when executed by a processor circuit of a memory system, cause the processor circuit to perform operations comprising receiving a plurality of access requests from a plurality of interfaces, allocating a transaction identifier for each of the plurality of access requests, for each access request of the plurality of access requests, writing a tail index of a reordering buffer to a remapping queue based on the transaction identifier, the tail index configured to provide a write address of a reordering buffer entry that is allocated for the access request, receiving a plurality of access request responses corresponding to the plurality of access requests, the plurality of access requests received in a first order and the plurality of corresponding access request responses received in a second order, for each access request response, writing a respective access request response from the plurality of access request responses to the allocated entry of the reordering buffer, and sorting the plurality of access request responses from the reordering buffer into a plurality of network queues in a same order as the plurality of corresponding access requests.

Each of these non-limiting examples can stand on its own or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system comprising:
   a host device comprising a first buffer with ordered data;
   an accelerator device comprising a data movement processor and a reordering buffer; and
   a multiple-channel interface coupling the host device and the data movement processor of the accelerator device;
   wherein the data movement processor is configured to:
   issue first read commands for a portion of the ordered data and, in coordination with issuing the read commands, allocate respective entries of the reordering buffer and corresponding respective transaction identifiers for the first read commands;
   maintain a remapping queue with a mapping between the transaction identifiers and corresponding tail indices of the reordering buffer;
   provide a valid vector having a same number of entries as the reordering buffer;
   maintain a head pointer corresponding to a next in-order entry to be read from the reordering buffer;
   receive unordered responses to the first read commands, each of the responses including a respective one of the transaction identifiers;
   store response data for the unordered responses at the corresponding allocated entries of the reordering buffer, based on the transaction identifiers respectively associated with the unordered responses, wherein storing the response data for the unordered responses comprises using information from the remapping queue to look up the tail index corresponding to the transaction identifier of each unordered response;
   in response to writing response data from an unordered response to its respective allocated entry of the reordering buffer, set a respective valid bit in the valid vector, the valid bit indicating that its corresponding allocated entry of the reordering buffer includes the response data; and
   when the head pointer corresponds to a particular entry of the reordering buffer and the valid bit for the particular entry is set, provide the response data from the particular entry of the reordering buffer to a particular interface queue of the multiple-channel interface, increment the head pointer, and clear the corresponding valid bit in the valid vector for the particular entry.

2. The system of claim 1, wherein the reordering buffer is a circular buffer.

3. The system of claim 1, wherein the first buffer comprises a contiguous buffer that stores operand address information.

4. The system of claim 1, wherein the multiple-channel interface comprises four channels coupled to respective request generators of the data movement processor.

5. The system of claim 1, wherein the data movement processor is configured to communicate the first read commands from a host device using a compute express link (CXL) interconnect.

6. The system of claim 1, further comprising a plurality of read command queues and each read command queue is associated with a respective free list, a respective remapping queue, and a respective reordering buffer.

7. The system of claim 1, wherein the data movement processor is configured to receive the unordered responses from a non-contiguous data region.

8. A method comprising:
   receiving a plurality of access requests from a plurality of interfaces;
   allocating a transaction identifier for each of the plurality of access requests;
   for each access request of the plurality of access requests, writing a tail index of a reordering buffer to a remapping queue based on the transaction identifier, the tail index configured to provide a write address of a reordering buffer entry that is allocated for the access request, wherein the remapping queue maintains a mapping between the transaction identifiers and the corresponding tail indices;

receiving a plurality of access request responses corresponding to the plurality of access requests, the plurality of access requests received in a first order and the plurality of corresponding access request responses received in a second order;

providing a valid vector having a same number of entries as the reordering buffer;

for each access request response, using information from the remapping queue to write a respective access request response from the plurality of access request responses to the corresponding allocated entry of the reordering buffer, wherein using the information from the remapping queue comprises looking up the tail index corresponding to the transaction identifier of the access request response;

in response to writing response data from an access request response to its respective allocated entry of the reordering buffer, setting a respective valid bit in the valid vector, the respective valid bit indicating that its corresponding allocated entry of the reordering buffer includes the response data;

maintaining a head pointer corresponding to a next in-order entry to be read from the reordering buffer; and when the head pointer corresponds to a particular entry of the reordering buffer for which the valid bit is set, providing the response data from the particular entry of the reordering buffer to a particular interface queue of the plurality of interfaces, incrementing the head pointer, and clearing the corresponding valid bit in the valid vector for the particular entry.

9. The method of claim 8, wherein the first order is different than the second order.

10. The method of claim 8, further comprising storing a plurality of operand addresses corresponding to the plurality of access requests in a contiguous index buffer, the contiguous index buffer configured to store the access requests in the first order.

11. The method of claim 8, wherein the reordering buffer is a circular queue.

12. The method of claim 8, wherein receiving a plurality of access requests includes communicating the plurality of access requests from a host device using a compute express link (CXL) interconnect.

13. The method of claim 8, comprising a plurality of access request queues and each access request queue is associated with a respective free list, a respective remapping queue, and a respective reordering buffer.

14. The method of claim 8, further comprising in response to writing the access request response to the allocated entry of the reordering buffer, returning a free list entry to the free list.

15. The method of claim 8, further comprising receiving the plurality of corresponding access request responses for data stored on a non-contiguously stored data region.

16. The method of claim 8, wherein allocating a transaction identifier for the access request comprises allocating a free list entry for the request from a free list, the free list entry associated with a transaction identifier of the access request.

17. The method of claim 8, wherein providing the response data to the particular interface queue includes providing the response data to a same interface, of the plurality of interfaces, from which the corresponding access request for the response data was received.

18. At least one non-transitory machine-readable storage medium comprising instructions that, when executed by a processor circuit of a memory system, cause the processor circuit to perform operations comprising:

receiving a plurality of access requests from a plurality of interfaces;

allocating a transaction identifier for each of the plurality of access requests;

for each access request of the plurality of access requests, writing a tail index of a reordering buffer to a remapping queue based on the transaction identifier, the tail index configured to provide a write address of a reordering buffer entry that is allocated for the access request;

receiving a plurality of access request responses corresponding to the plurality of access requests, the plurality of access requests received in a first order and the plurality of corresponding access request responses received in a second order;

providing a valid vector having a same number of entries as the reordering buffer;

for each access request response, using information from the remapping queue to write a respective access request response from the plurality of access request responses to the corresponding allocated entry of the reordering buffer, wherein using the information from the remapping queue comprises looking up the tail index corresponding to the transaction identifier of the access request response;

in response to writing response data from an access request response to its respective allocated entry of the reordering buffer, setting a respective valid bit in the valid vector, the respective valid bit indicating that its corresponding allocated entry of the reordering buffer includes the response data;

maintaining a head pointer corresponding to a next in-order entry to be read from the reordering buffer; and when the head pointer corresponds to a particular entry of the reordering buffer for which the valid bit is set, providing the response data from the particular entry of the reordering buffer to a particular interface queue of the plurality of interfaces, incrementing the head pointer, and clearing the corresponding valid bit in the valid vector for the particular entry.

\* \* \* \* \*